United States Patent [19]

Ichinomiya et al.

[11] Patent Number: 5,422,697

[45] Date of Patent: Jun. 6, 1995

[54] APERTURE DEVICE WITH EDGE REFLECTION DISPERSEMENT FEATURE AND OPTICAL APPARATUS USING THE SAME

[75] Inventors: Mitsuru Ichinomiya; Kimio Tanaka; Toshinori Higaki; Shigeru Oshima, all of Yokohama, Japan

[73] Assignee: Canon Kabushiki Kaisha, Tokyo, Japan

[21] Appl. No.: 40,272

[22] Filed: Mar. 30, 1993

[30] Foreign Application Priority Data

Apr. 2, 1992 [JP] Japan .................... 4-080771

[51] Int. Cl.$^6$ .................... G03B 9/02; G02B 27/44
[52] U.S. Cl. .................... 354/274; 359/738; 359/707; 359/565; 359/575
[58] Field of Search .............. 359/738, 739, 707, 565, 359/575, 568, 612; 354/270, 274, 296; 353/97

[56] References Cited

U.S. PATENT DOCUMENTS 3,675,562  7/1972  Sanada et al. .................... 354/274
3,682,075  8/1972  Profitt .................... 354/296

Primary Examiner—Georgia Y. Epps
Assistant Examiner—Evelyn A. Lester
Attorney, Agent, or Firm—Fitzpatrick, Cella, Harper & Scinto

[57] ABSTRACT

An aperture device for use in an optical apparatus has a plurality of aperture blades which cooperate in collectively defining an aperture of a desired size. The inner edge of at least one of such blades defining one side of the aperture is uneven over at least part of the length of the inner edge. The spacing between adjacent relatively high portions and relatively low portions, as well as the depth, is smaller than the exposed length of the inner edge of each aperture blade when the aperture device has been operated to the minimum aperture size. Preferably, the spacing between adjacent crests or between adjacent high portions and low portions of the unevenness varies in a non-periodic manner.

12 Claims, 5 Drawing Sheets

APERTURE DEVICE WITH EDGE REFLECTION DISPERSEMENT FEATURE AND OPTICAL APPARATUS USING THE SAME

BACKGROUND OF THE INVENTION

1. Field of the Invention

The present invention relates to an improved aperture device which is designed to disperse reflection of light to suppress degradation of image quality from an edge of an aperture component and also to an optical apparatus which incorporates the aperture device.

2. Description of the Related Art

It has been known that uncontrolled reflection of light inside a lens barrel causes a halo or ghost effect on the image plane which degrades the quality of the image. To avoid this problem, it has been proposed to apply a light-absorbing black paint to the inner surface of the lens barrel and the aperture blade surfaces to control reflection of light and thereby prevent degradation of the image quality.

However, taking of an image of a bright object such as the sun, tends to cause a radial ghost image formed around the object image. An analysis conducted by the present inventors has proved that such a ghost image is attributable to light reflected from the inner edge of the aperture's blades. The inner edge is that edge of the shutter blade which forms a side of the aperture.

FIG. 6 shows the state in which strong light impinges upon the inner edge of each aperture blade 10 of an iris aperture device. This strong light is reflected by the inner edge so as to cause a ghost image. FIG. 7 illustrates an aperture 11 defined by the inner edges of six blades, two of which are depicted by reference numerals 10, 10'.

The ghost image is generated in the direction perpendicular to the inner edge of each aperture blade defining the aperture, i.e., the edge of the aperture blade defining one side of a substantially polygonal aperture. Thus, the ghost image appears radially in six directions when six aperture blades are involved and in eight directions when eight aperture blades are used in the aperture device. Generation of a ghost image is more serious when the aperture diameter is small because in such a case the quantity of light reflected by the aperture blade edges constitutes a large proportion relative to the quantity of the imaging light.

SUMMARY OF THE INVENTION

Accordingly, an object of the present invention is to provide an aperture device in which reflection of light from the aperture blades is controlled, as well as an optical apparatus incorporating such an aperture device.

Another object of the present invention is to provide an aperture device which is designed to prevent degradation of the image quality, as well as an optical apparatus incorporating such an aperture device.

Still another object of the present invention is to provide an aperture device, as well as an optical apparatus, having a plurality of aperture blades and a small aperture plate, which is interposed in the path of imaging light when a small aperture size is to be obtained, wherein light reflected by the edges of the aperture blade and the light reflected by the edge of the small aperture plate are diffused so as to reduce the quantity of light which is directed to the imaging plane.

According to one aspect of the invention, an aperture device comprises a plurality of aperture blades each having an inner edge, which collectively define an aperture of a desired size to restrict the amount of light reaching an imaging surface, wherein at least a portion of the inner edge of at least one of the aperture blades is uneven so as to have relatively high portions to effect the spreading of light incident thereon such that the intensity of the incident light directed towards the imaging surface is reduced.

According to another aspect of the invention, an aperture device comprises a plurality of aperture blades each having an inner edge, which collectively define an aperture of a desired size to restrict the amount of light reaching an imaging surface; and an additional aperture blade projectable into a path of the light and having an aperture of a minimum aperture size, wherein at least a portion of the inner edge of at least one of the aperture blades is uneven so as to have relatively high portions adjacent to relatively low portions to effect the spreading of light incident thereon such that the intensity of the incident light directed towards the imaging surface is reduced.

According to yet another aspect of the invention, an optical apparatus comprises optical means for focusing a light beam from an object along a light path on an imaging surface; and an aperture stop projectable into the light path and having an edge thereof, wherein a portion of the edge is formed to be uneven so as to have relatively high portions adjacent to relatively low portions to effect the spreading of light incident thereon so that the intensity of light directed towards the imaging surface is reduced.

The above and other objects, features and advantages of the present invention will become clear from the following description when the same is read in conjunction with the accompanying drawings.

DESCRIPTION OF THE PREFERRED EMBODIMENTS

Figure 1:
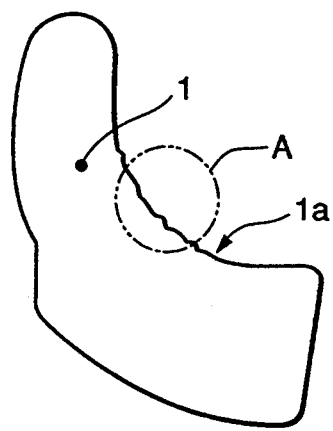
FIG. 1 is a front elevational view of an aperture blade used in an embodiment of the aperture device of the present invention.
Figure 2:
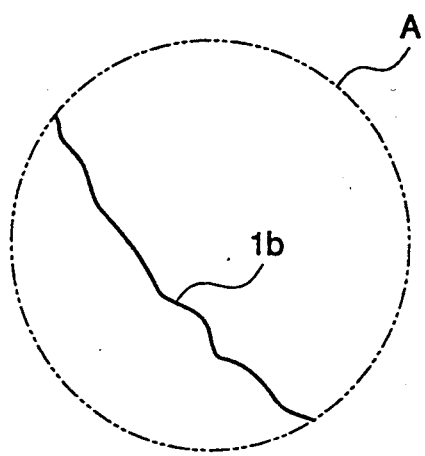
FIG. 2 is an enlarged view of the aperture blade shown in FIG. 1.

FIG. 1 shows one of a plurality of aperture blades 1 which in combination form an aperture diaphragm. In the assembled state of the aperture device, inner edges 1a of the aperture blades collectively define the aperture and, hence, are contacted by the exposure light. As will be seen from FIG. 2 which shows a portion encircled by a circle A (See FIG. 1) of the blade in a greater scale, a minute undulation or unevenness is formed as indicated by 1b on the inner edge 1a of the aperture blade. By "undulation" and "unevenness", it is meant that a diaphragm blade, when viewed in a direction of the optical axis, will be seen as being uneven, having relatively higher portions and relatively lower portions. The higher portions are closer to the optic axis while the lower portions are more distance from the optical axis relative to an adjacent higher portion. Although in FIG. 2 the unevenness is formed over the entire length of the inner edge, this is only illustrative of one embodiment of the invention and the unevenness may be formed only on the portion of the inner edge which is exposed to the light when the aperture size has been reduced.

Figure 3:
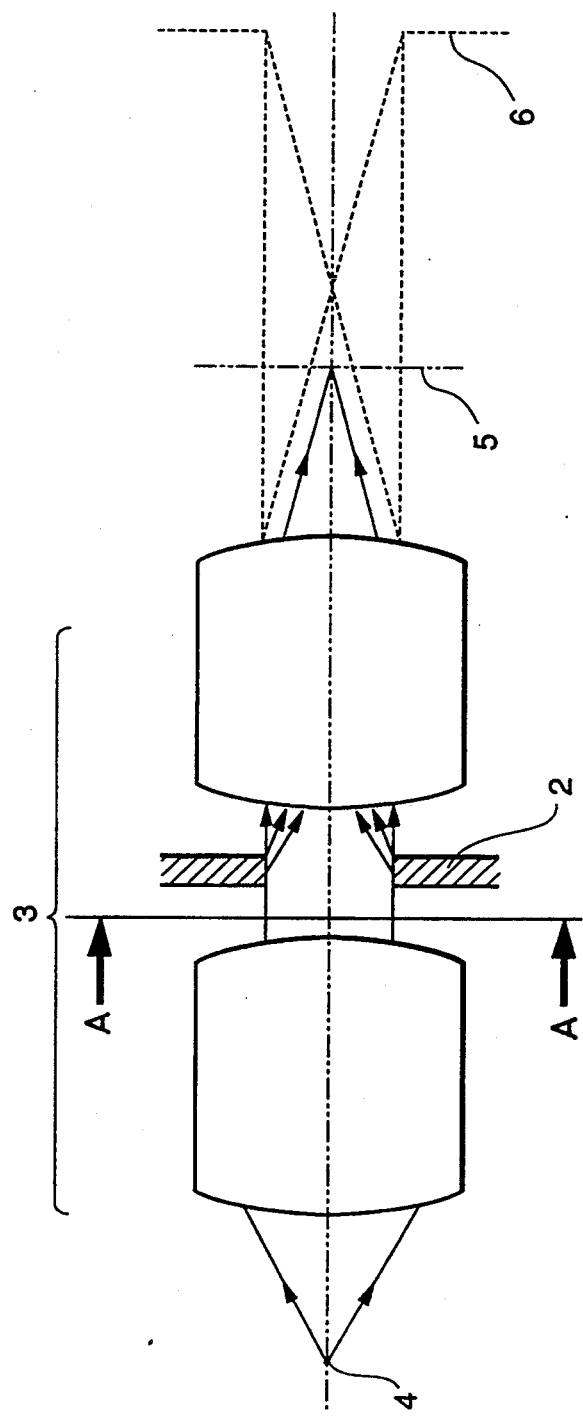
FIG. 3 is a vertical sectional view of an optical apparatus embodying the present invention.
Figure 7:
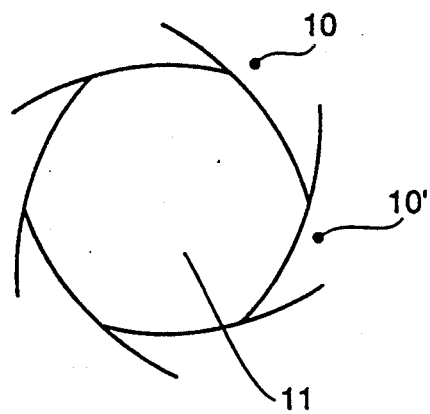
FIG. 7 is a schematic illustration of an aperture defined by a plurality of aperture blades.

FIG. 3 illustrates an aperture device 2 of the present invention incorporated in an image forming optical system such as, for example, a zoom lens unit for a television camera. The light from a light source 4 is focused on an imaging plane past the lenses and aperture which are incorporated in the imaging optical system 3. The aperture device 2 has a configuration as illustrated in FIG. 7 when viewed in the direction of the arrow A—A (See FIG. 3), provided that six aperture blades 1 are employed. Numeral 5 denotes the imaging plane of the imaging optical system 3, while 6 indicates the exit pupil. The imaging optical system is shown only schematically in FIG. 3. Thus, a number of other lenses and elements which are not shown may actually be employed in the imaging optical system.

Figure 5:
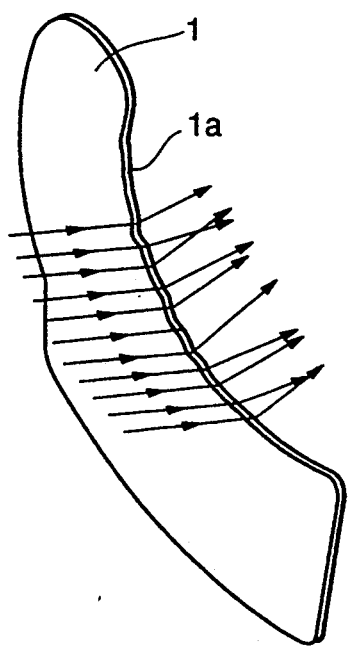
FIG. 5 is an illustration of an optical effect on light incident on the edge of the aperture blade used in the present invention.
Figure 6:
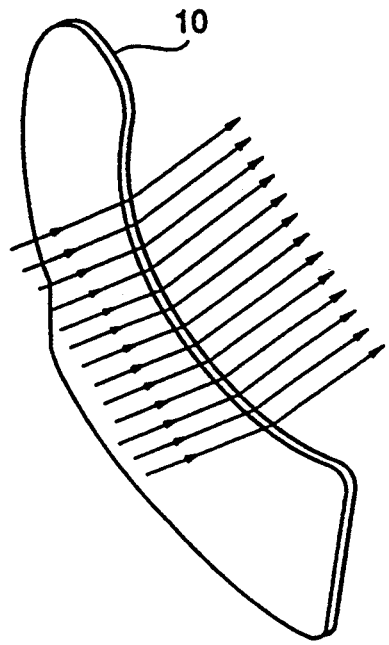
FIG. 6 is an illustration of an optical effect of the light incident on the edge of a known aperture blade.

As will be seen from FIG. 5, a collimated light beam impinging upon the inner edge 1a of each aperture blade 1 is reflected in a random manner, in contrast to the case of a conventional aperture blade in which, as shown in FIG. 6, the light is regularly reflected.

More specifically, in the conventional aperture blade having a smooth inner edge without any unevenness, as shown in FIG. 6, only a small portion of the light beam is diffused in the direction perpendicular to the plane of the sheet of the drawing showing FIG. 6, so that a linear ghost image is generated on the imaging plane in the direction perpendicular to the end surface of the aperture blade. In general, the aperture is collectively defined by a plurality of aperture blades. Therefore, linear ghost images appear in a radial manner in six directions in the case of the arrangement shown in FIG. 7. Thus, the radial ghost image has n linear components when n aperture blades are employed.

In contrast, in the aperture blade used in the aperture device of the present invention, inflection points or discontinuity points appear due to the unevenness in the direction tangent to the end surface of the aperture blade shown in FIG. 5, thus reducing the directivity of the reflected light. At the same time, light is diffused also in the directions perpendicular to the plane of the sheet of the drawing showing FIG. 3, so that the light component in the plane of the sheet is reduced. Thus, the directivity of the ghosting light is reduced due to diffusion or spreading of the light, so that the intensity of the light directed towards the imaging surface is reduced.

The inflection point or discontinuity of the curve must be tangential direction to the inner edge even when the aperture device has been operated to the minimum aperture size. This means that the pitch of the unevenness or minute undulation, i.e., the distance between adjacent crests or the distance between adjacent valleys, as well as the depth of the valley, should not be greater than the length of the inner edge determining the minimum aperture size.

Figure 4:
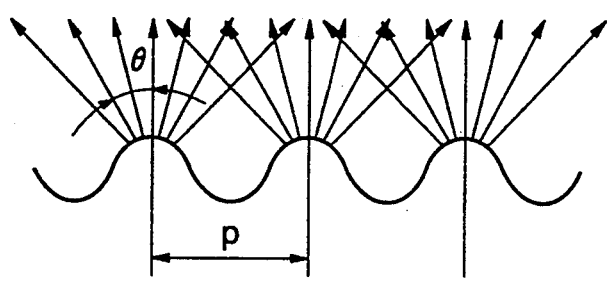
FIG. 4 is an enlarged view of an edge of an aperture blade showing minute regular undulation or unevenness formed thereon in an exaggerated manner.

FIG. 4 illustrates the case where the unevenness or minute undulation is uniformly periodic along the inner edge. In such a case, there is a risk that the reflected light components will interfere with each other and strengthen each other, when the following condition is substantially met:

$$p \cdot \sin \theta = N \cdot \lambda$$

where P represents the pitch of the unevenness, $\theta$ represents the angle of reflection, N represents an integer and $\lambda$ represents the wavelength.

In such a case, the radial pattern of the ghost image may be divided into plural fractions due to interference. This problem, however, can be overcome by reducing the interference by adopting an irregular pitch of the unevenness or undulation.

Thus, when the aperture device is used for a comparatively small but bright object such as a spot light source, it is preferred that the pitch of the unevenness is irregular or non-periodic, in order to avoid diffraction of light which tends to appear when the object is small and bright.

In order that the amount of variation in the incident light quantity caused by provision of the minute undulation on the inner edge of the aperture blade falls within a predetermined allowable range without requiring any specific structure, the depth or height of the unevenness or minute undulation is preferably smaller than the length of one side of the smallest aperture, i.e., the length of the inner edge of each aperture blade appearing when the aperture size is minimized.

The minute undulation can be formed by means of, for example, a pressing, etching or wire-cutting method. The minute undulation also can be formed by other kinds of processing such as napping, or painting with a paint containing particles of various particle sizes, and so forth.

The unevenness or the minute undulation may be formed in accordance with a geometrical series or an arithmetical series rather than being random.

Figure 8:
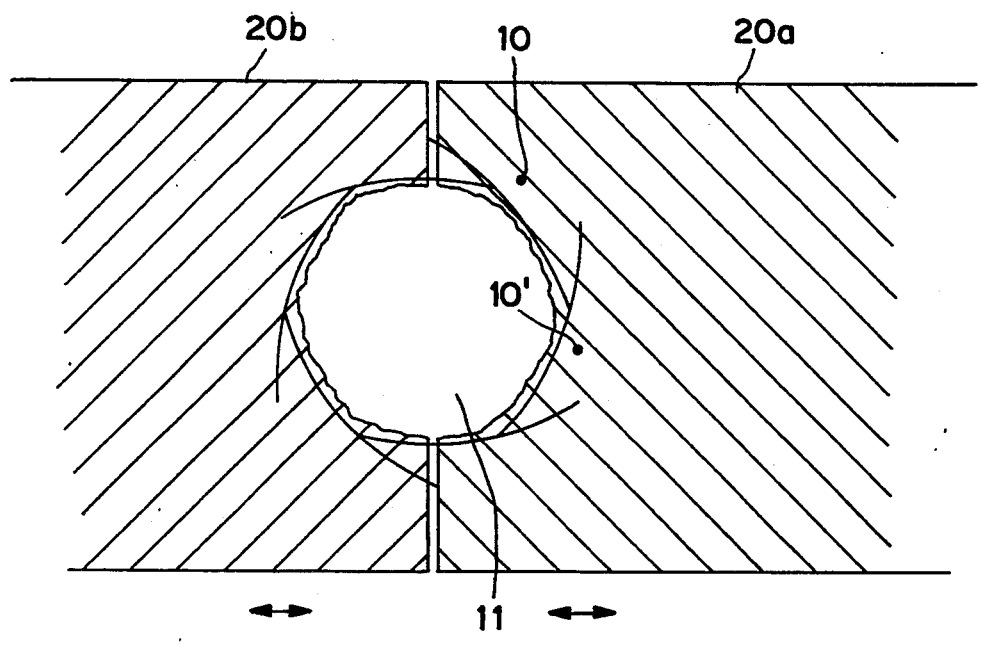
FIG. 8 is an illustration of an aperture device including an aperture plate.

Although an aperture device having six or more aperture blades has been described, it will be clear to those skilled in the art that the same advantage is obtained with the aperture device having a pair of aperture blades even when the invention is applied to an aperture device having only two aperture blades or an aperture device of the type which employs a small aperture plate 20a, 20b (as shown in FIG. 8, for example) which is put into the path of light when the aperture size is to be minimized, provided that the unevenness or minute undulation is formed on the inner edge of the aperture blade or the small aperture plate.

As will be understood from the foregoing description, according to the present invention, it is possible to remarkably suppress generation of a ghost image on an image formed through an aperture device, even when the aperture device is directed toward a bright object.

What is claimed is:

1. An aperture device, comprising:
   a plurality of aperture blades each having an inner edge, which collectively define an aperture of a desired size to restrict an amount of light reaching an image surface,
   wherein at least a portion of said inner edge of at least one of said aperture blades is uneven so as to have relatively high portions adjacent to relatively low portions, wherein said high portions and said low portions are significant enough to visibly effect the spreading of light incident thereon such that the intensity of the incident light directed towards the imaging surface is reduced; and wherein a spacing between adjacent high portions and low portions varies in a non-periodic manner.

2. An aperture device according to claim 1, wherein a spacing between adjacent high portions and low portions is smaller than an exposed length of said inner edge of said at least one of said plurality of aperture blades when the aperture device has been operated to minimum aperture size.

3. An aperture device according to claim 1, wherein a difference in height between adjacent high portions and low portions is smaller than an exposed length of said inner edge of each aperture blade when the aperture device has been operated to a minimum aperture size.

4. An aperture device, comprising:

a plurality of aperture blades each having an inner edge, which collectively define an aperture of a desired size to restrict an amount of light reaching an image surface, wherein at least a portion of said inner edge of at least one of said aperture blades is uneven so as to have relatively high portions adjacent to relatively low portions, wherein said high portions and said low portions are significant enough to visibly effect the spreading of light incident thereon such that the intensity of the incident light directed towards the imaging surface is reduced; and wherein a spacing between adjacent high portions and a difference in height between adjacent high portions and adjacent low portions are smaller than an exposed length of said inner edge of each aperture blade when the exposure device has been operated to the minimum aperture size, and wherein the spacing between the adjacent high portions and adjacent low portions varies in a non-periodic manner.

5. An aperture device, comprising:

a plurality of aperture blades each having an inner edge, which collectively define an aperture of a desired size to restrict an amount of light reaching an imaging device; and an aperture plate projectable into a path of the light and having an aperture of a minimum aperture size, wherein at least a portion of said inner edge of said aperture plate is uneven so as to have relatively high portions adjacent to relatively low portions, wherein said high portions and said low portions are significant enough to visibly effect the spreading of light incident thereon such that the intensity of the incident light directed towards the imaging surface is reduced.

6. An aperture device according to claim 5, wherein a spacing between adjacent high portions and low portions is smaller than an exposed length of an inner edge of said aperture plate when the aperture device has been operated to the minimum aperture size.

7. An aperture device according to claim 5, wherein a difference in height between adjacent high portions and said adjacent low portions is smaller than an exposed length of an inner edge of each aperture blade when the aperture device has been operated to the minimum aperture size.

8. An aperture device according to claim 5, wherein a spacing between adjacent high portions and low portions varies in a non-periodic manner.

9. An optical apparatus, comprising:

optical means for focusing a light beam from an object along a light path on an imaging surface; and an aperture stop projectable into the light path and having an edge thereof, wherein a portion of said edge is formed to be uneven so as to have relatively high portions adjacent to relatively low portions, wherein said high portions and said low portions are significant enough to visibly effect the spreading of light incident thereon so that the intensity of light directed towards the imaging surface is reduced; and wherein a spacing between adjacent high portions and low portions varies in a non-periodic manner.

10. An optical apparatus according to claim 9, wherein said aperture stop has a plurality of aperture blades each having an inner edge, which collectively define an aperture of a desired size to restrict an amount of light reaching an imaging surface, wherein at least a portion of said inner edge of at least one of said aperture blades is uneven so as to have relatively high portions adjacent to relatively low portions to effect the spreading of light incident thereon such that the intensity of the incident light directed towards the imaging surface is reduced.

11. An aperture device according to claim 9, wherein a spacing between adjacent high portions and low portions is smaller than an exposed length of said inner edge of said at least one of said plurality of aperture blades when the aperture device has been operated to a minimum aperture size.

12. An aperture device according to claim 9, wherein a difference in height between adjacent high portions and low portions is smaller than an exposed length of said inner edge of each aperture blade when the aperture device has been operated to a minimum aperture size.

* * * * *